United States Patent
Pagan

(10) Patent No.: US 9,479,561 B2
(45) Date of Patent: Oct. 25, 2016

(54) PROCESSING COMPUTER GRAPHICS GENERATED BY A REMOTE COMPUTER FOR STREAMING TO A CLIENT COMPUTER

(71) Applicant: LENOVO ENTERPRISE SOLUTIONS (SINGAPORE) PTE. LTD., Singapore (SG)

(72) Inventor: William G. Pagan, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 871 days.

(21) Appl. No.: 13/847,716

(22) Filed: Mar. 20, 2013

(65) Prior Publication Data

US 2013/0212294 A1 Aug. 15, 2013

Related U.S. Application Data

(63) Continuation of application No. 12/121,343, filed on May 15, 2008, now Pat. No. 8,456,380.

(51) Int. Cl.
*G06F 3/14* (2006.01)
*H04L 29/06* (2006.01)
*G09G 5/14* (2006.01)

(52) U.S. Cl.
CPC ........... *H04L 65/607* (2013.01); *G06F 3/1454* (2013.01); *G09G 5/14* (2013.01); *G09G 2340/02* (2013.01)

(58) Field of Classification Search
CPC ..... H04L 65/607; G06F 3/1454; G09G 5/14; G09G 2340/02
See application file for complete search history.

(56) References Cited

U.S. PATENT DOCUMENTS

| | | | | |
|---|---|---|---|---|
| 4,369,464 A | * | 1/1983 | Temime | H04N 19/503 375/240.12 |
| 5,457,776 A | | 10/1995 | Wong et al. | |
| 5,563,960 A | * | 10/1996 | Shapiro | H04N 1/40093 375/240.11 |
| 5,875,270 A | * | 2/1999 | Nakamura | H03M 7/3088 382/232 |
| 5,991,515 A | | 11/1999 | Fall et al. | |
| 6,088,061 A | * | 7/2000 | Katata | H04N 19/61 348/390.1 |
| 6,118,898 A | * | 9/2000 | Chen | G06T 9/008 358/539 |
| 6,178,204 B1 | * | 1/2001 | Hazra | H04N 21/4728 375/240.25 |

(Continued)

OTHER PUBLICATIONS

Tao, et al.; Active Window Oriented Dynamic Video Retargeting; Department of Computer Science and Engineering; CUHK; Hong Kong.

(Continued)

*Primary Examiner* — Tom Sheng
(74) *Attorney, Agent, or Firm* — Brandon C. Kennedy; Katherine S. Brown; Kennedy Lenart Spraggins LLP

(57) ABSTRACT

Processing computer graphics generated by a remote computer for streaming to a client computer for display on a display device operatively coupled to the client computer, the graphics streamed to the client computer in a plurality of frames, including, for each frame: selecting, by a graphics module of the remote computer in dependence upon a compression profile, regions of the frame to compress at a lower compression rate than other regions of the frame; compressing the frame for streaming; streaming the compressed frame to the client computer; receiving the compressed frame in the stream; decompressing the compressed frame; and displaying the decompressed frame on the display device operatively coupled to the client computer.

16 Claims, 4 Drawing Sheets

(56) References Cited

U.S. PATENT DOCUMENTS

| | | | |
|---|---|---|---|
| 6,195,391 B1 | 2/2001 | Hancock et al. | |
| 6,415,057 B1 | 7/2002 | Suzuki et al. | |
| 6,483,609 B1* | 11/2002 | Ueno | H04N 1/41 358/1.2 |
| 6,633,339 B1* | 10/2003 | Goto | H04N 21/44016 348/425.4 |
| 6,650,773 B1 | 11/2003 | Maurer et al. | |
| 6,751,356 B2* | 6/2004 | Oki | G06T 9/007 382/190 |
| 6,853,466 B1* | 2/2005 | Harada | G06K 15/02 358/1.9 |
| 6,891,888 B2* | 5/2005 | Enomoto | H04N 1/0096 348/96 |
| 6,937,767 B1* | 8/2005 | Burak | H04N 19/172 375/E7.04 |
| 7,062,088 B1 | 6/2006 | Clauson | |
| 7,065,782 B2 | 6/2006 | Shimoji et al. | |
| 7,085,420 B2 | 8/2006 | Mehrotra | |
| 7,120,297 B2 | 10/2006 | Simard et al. | |
| 7,397,851 B2 | 7/2008 | Roman | |
| 7,512,277 B2* | 3/2009 | Ducksbury | H04N 19/63 375/240 |
| 7,529,298 B2* | 5/2009 | Yasuda | H04N 19/37 348/14.02 |
| 7,680,345 B2* | 3/2010 | Ito | H04N 19/12 382/232 |
| 7,697,768 B2* | 4/2010 | Ishiyama | H04N 7/17336 382/232 |
| 7,751,603 B2* | 7/2010 | Yamasaki | H04N 1/32133 382/128 |
| 7,839,926 B1* | 11/2010 | Metzger | H04N 5/144 375/240.01 |
| 7,881,369 B2* | 2/2011 | Murai | H04N 19/176 358/1.1 |
| 7,894,530 B2* | 2/2011 | Gordon | H04N 19/70 375/240.18 |
| 7,986,846 B2* | 7/2011 | Seo | H04N 21/25808 375/240.25 |
| 8,456,380 B2* | 6/2013 | Pagan | G06F 3/1454 345/2.2 |
| 2002/0012471 A1 | 1/2002 | Nayyar | |
| 2002/0048322 A1* | 4/2002 | Yamamoto | H04N 5/4401 375/240.12 |
| 2002/0090140 A1 | 7/2002 | Thirsk | |
| 2003/0202581 A1* | 10/2003 | Kodama | H04N 19/63 375/240.03 |
| 2005/0073448 A1* | 4/2005 | Buxton | H03M 7/30 341/87 |
| 2005/0235214 A1* | 10/2005 | Shimizu | G06F 3/0481 715/740 |
| 2006/0087553 A1 | 4/2006 | Kenoyer et al. | |
| 2007/0047660 A1* | 3/2007 | Mitani | H04N 19/159 375/240.25 |
| 2007/0065032 A1* | 3/2007 | Hernandez | H04N 19/115 382/239 |
| 2007/0183493 A1* | 8/2007 | Kimpe | G06F 21/6245 375/240.1 |
| 2008/0239335 A1* | 10/2008 | Lee | H04N 19/176 358/1.6 |
| 2009/0284442 A1 | 11/2009 | Pagan | |
| 2010/0110298 A1* | 5/2010 | Knee | H04N 7/17318 348/581 |

OTHER PUBLICATIONS

DELOS Task 3.7 (and Task 4.5b): MIMA: Multimedia Interfaces for Mobile Applications; DELOS; Network of Excellence on Digital Libraries; UNIFI-MICC; Italy.
Office Action, U.S. Appl. No. 12/121,343, Jun. 10, 2011, pp. 1-12.
Office Action, U.S. Appl. No. 12/121,343, Nov. 21, 2011, pp. 1-10.
Office Action, U.S. Appl. No. 12/121,343, May 31, 2012, pp. 1-9.
Notice of Allowance, U.S. Appl. No. 12/121,343, Dec. 28, 2012, pp. 1-7.

* cited by examiner

PROCESSING COMPUTER GRAPHICS GENERATED BY A REMOTE COMPUTER FOR STREAMING TO A CLIENT COMPUTER

CROSS-REFERENCE TO RELATED APPLICATION

This application is a continuation application of and claims priority from U.S. patent application Ser. No. 12/121,343, filed on May 15, 2008.

BACKGROUND OF THE INVENTION

1. Field of the Invention

The field of the invention is data processing, or, more specifically, methods, apparatus, and products for processing computer graphics generated by a remote computer for streaming to a client computer.

2. Description Of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Some computer systems today may be operated remotely through another computer over a data communications network. To accomplish this task, video graphics local to the remotely operated computer system are compressed and transmitted over the data communications network to the other computer system for display on a monitor connected to that other computer system. The greater the compression rate used to compress the local video graphics, the lower the visual quality of the graphic when displayed at the remote computer. Visual quality of some portion of the graphics may be more important to a user than other portions.

SUMMARY OF THE INVENTION

Methods, apparatus, and products for processing computer graphics generated by a remote computer for streaming to a client computer for display on a display device operatively coupled to the client computer, the graphics streamed to the client computer in a plurality of frames, the client computer connected for data communications to the remote computer through a data communications network, including, for each frame: dynamically selecting, by a graphics module of the remote computer in dependence upon a compression profile that includes one or more selection rules, one or more regions of the frame to compress at a lower compression rate than other regions of the frame; compressing, by the graphics module, the frame for streaming including compressing the selected regions of the frame at a lower compression rate than the other regions of the frame; streaming the compressed frame to the client computer; receiving, by a client graphics module of the client computer, the compressed frame in the stream; decompressing, by the client graphics module, the compressed frame including identifying the one or more regions of the frame compressed at the lower compression rate than other regions of the frame; and displaying the decompressed frame on the display device operatively coupled to the client computer.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
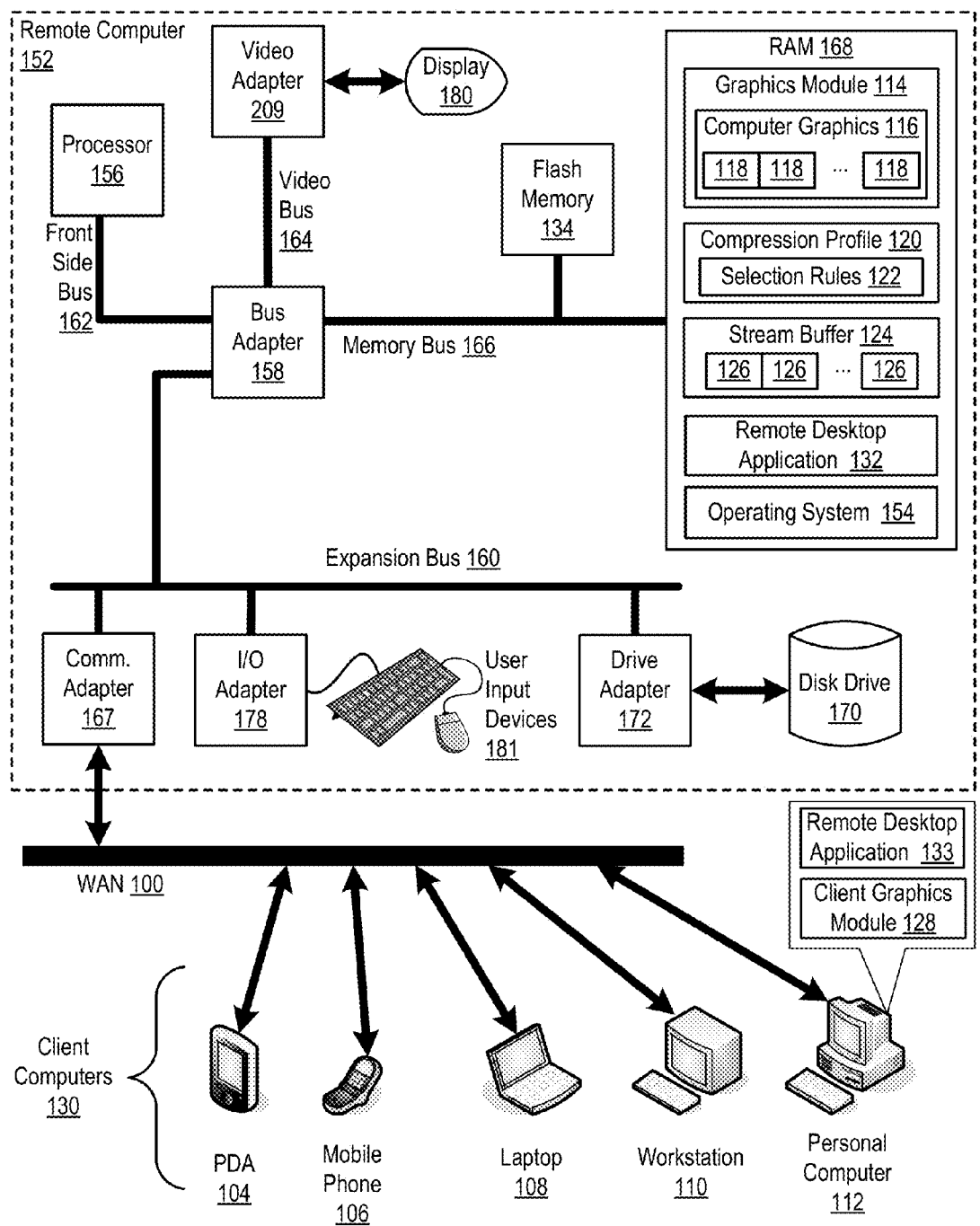
FIG. 1 sets forth a functional block diagram of an exemplary system for processing computer graphics generated by a remote computer for streaming to a client computer according to embodiments of the present invention.

Exemplary methods, apparatus, and products for processing computer graphics generated by a remote computer for streaming to a client computer in accordance with the present invention are described with reference to the accompanying drawings, beginning with FIG. 1. FIG. 1 sets forth a functional block diagram of an exemplary system for processing computer graphics generated by a remote computer (152) for streaming to a client computer (130) according to embodiments of the present invention. The term 'remote' as used here to describe computer (152) indicates that such computer (152) is physically located remotely from another computer, in this specification, a client computer (130).

Figure 3:
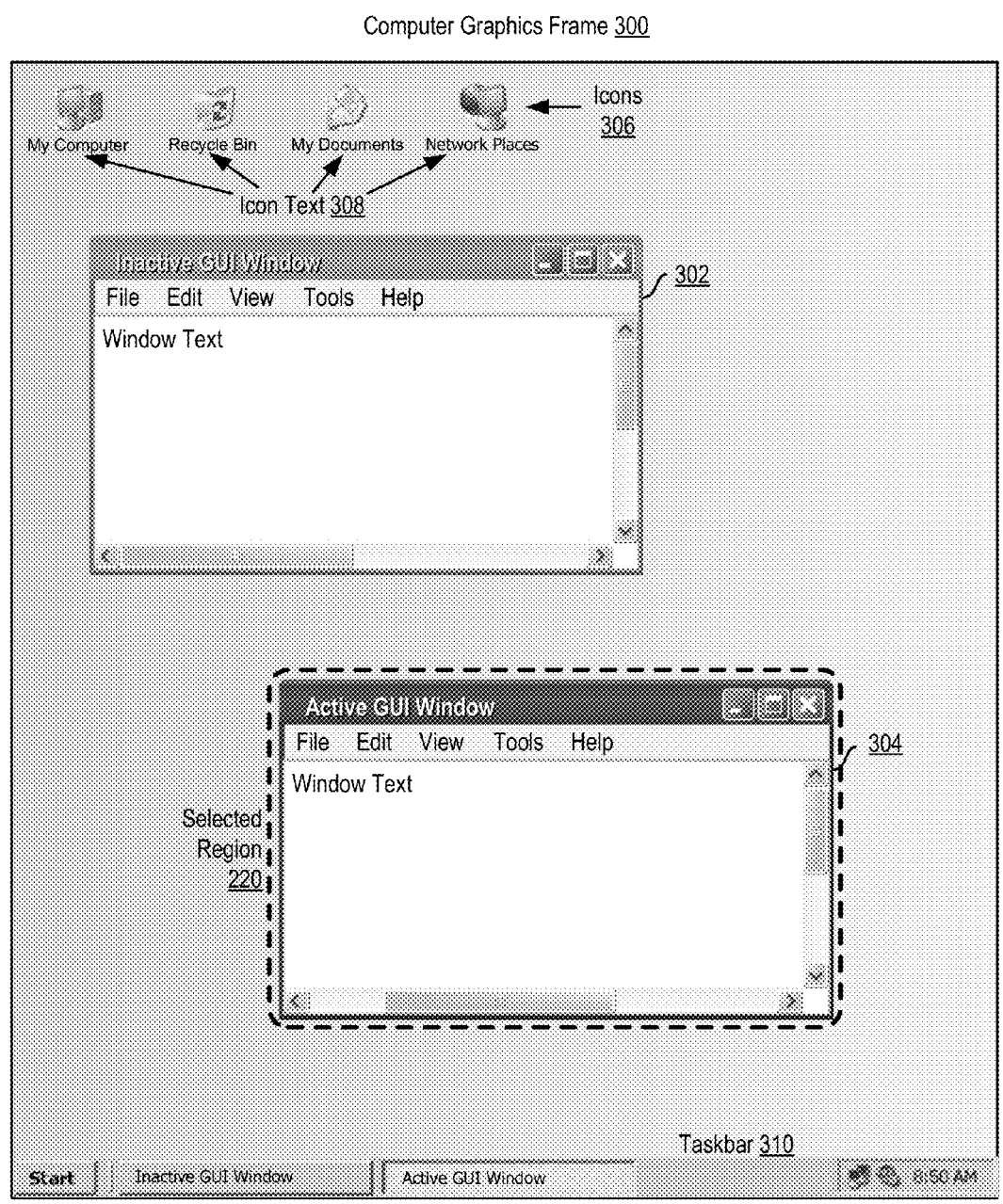
FIG. 3 sets forth a line drawing of an exemplary processed frame of computer graphics generated by a remote computer for streaming to a client computer according to embodiments of the present invention.
Figure 4:
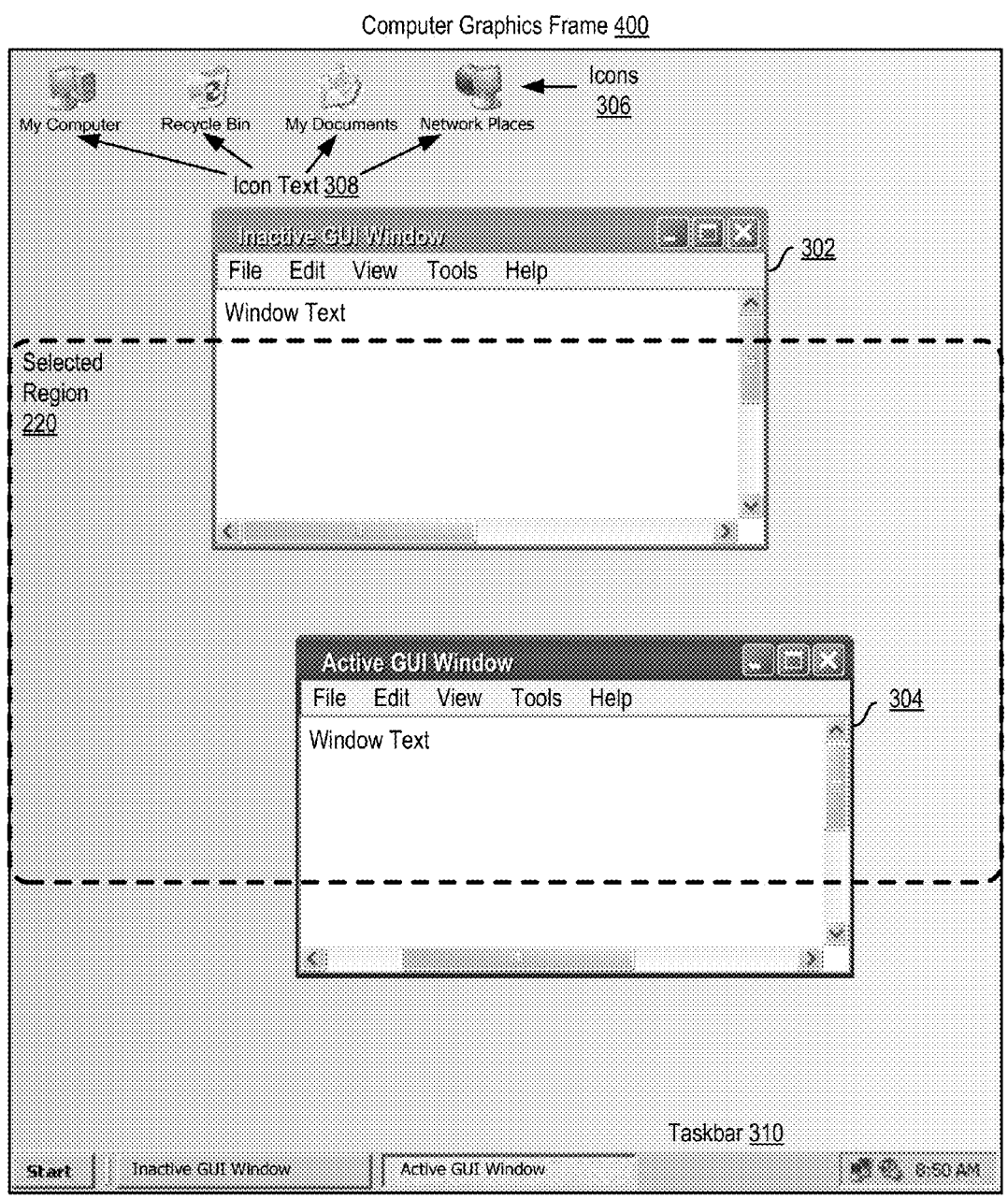
FIG. 4 sets forth a line drawing of a further exemplary processed frame of computer graphics generated by a remote computer for streaming to a client computer according to embodiments of the present invention.

In the example of FIG. 1, graphics generated by the remote computer (152) are streamed as a plurality of frames through the WAN (100) from the remote computer to the client computer where they may be displayed a computer display device, such as a monitor, coupled to the client computer (130). A 'frame' as the term is used in this specification is a representation of all computer graphics displayed on a computer display at a particular point in time. A frame may be defined by analogy to a video frame which is one of many still images that make up a video. Examples of frames displaying a desktop and one or more application windows are depicted in FIGS. 3 and 4, described in detail below.

In the example of FIG. 1, computers are described as 'client computers' when they organized in a client-server configuration with the remote computer (152). Client computers (130) in the example of FIG. 1 include the personal digital assistant ('PDA') (104), mobile phone (106), laptop (108), workstation (110), and personal computer (112). Each of the client computers is connected to the remote computer (152) for data communications through the wide area network ('WAN') (100), and is organized in a client-server relationship with the remote computer (152). The remote computer (152) in this example functions as a server in the client-server relationship enabling the client computers to control the remote computer as if the client computer was the remote computer through a client-side remote desktop application (133) and a server-side remote desktop application (132). Remote desktop software packages enable remote access and remote administration of a server by a client through graphical user interface applications executed remotely on a server, the remote computer (152) in this example, while being displayed locally on a computer display operatively coupled to the client computer. Examples of typical remote desktop protocols include Virtual Network Computing ('VNC'), Remote Desktop Protocol ('RDP'), NX technology ('NX'), Independent Computing Architecture ('ICA'), and X window System ('X11').

The client-side (133) and server-side (132) remote desktop applications operate together to provide the functionality of a remote desktop software package, the client-side (133) application handling client-side functionality, and the server-side application (132) handling server-side functionality. The client-side remote desktop application (133) may for example, initiate and establish communications with the server-side remote desktop application, transmits local, client-side I/O commands to the server-side remote desktop application, receives a stream of graphics from the server-side remote desktop application and so on. The server-side remote desktop application (132) may for example, authenticate the client-side remote desktop application for connection and control of the remote computer, process I/O commands received from the client-side remote desktop application as server-side I/O commands, stream graphics to the client-side remote desktop application, and so on.

The remote computer (152) of FIG. 1 includes at least one computer processor (156) or 'CPU' as well as random access memory (168) ('RAM') which is connected through a high speed memory bus (166) and bus adapter (158) to processor (156) and to other components of the remote computer (152). Stored in RAM (168) is graphics module (114), a set of computer program instructions that processes computer graphics (116) generated by the remote computer (152) for streaming to a client computer (130) according to embodiments of the present invention by: dynamically selecting, for each frame (118) by the graphics module (114) of the remote computer (152) in dependence upon a compression profile (120) that includes one or more selection rules (122), one or more regions of the frame (118) to compress at a lower compression rate than other regions of the frame (118); compressing, by the graphics module (114), the frame (118) for streaming including compressing the selected regions of the frame (118) at a lower compression rate than the other regions of the frame; and streaming the compressed frame (126) to the client computer (130). Streaming the compressed frame to the client computer may include storing compressed frames (126) in a stream buffer for orderly transmission over the WAN (100) to the client computer (130).

Each of the client computers (130) in the example of FIG. 1 includes a client graphics module (128), a set of computer program instructions that processes computer graphics (116) generated by the remote computer (152) and streamed to the client computer (130) by: receiving, by a client graphics module (128) of the client computer (130), the compressed frame (126) in the stream; decompressing, by the client graphics module (128), the compressed frame (126) including identifying the one or more regions of the frame (126) compressed at the lower compression rate than other regions of the frame (126); and displaying the decompressed frame (118) on the display device operatively coupled to the client computer.

The graphics module (114) in the example of FIG. 1 is depicted as a standalone software application stored in RAM (168). Readers of skill in the art will recognize, however, that graphics modules useful for processing computer graphics generated by a remote computer for streaming to a client computer in accordance with embodiments of the present invention may also be implemented as a software component of the remote desktop application (132), as an aggregation of synchronous and asynchronous logic in the video adapter, as a module of computer program instructions stored in memory designated for graphics processing and executed by a dedicated graphics processor of the video adapter (209), and so on. Likewise, the client graphics module may also be implemented as a standalone program, a software component of a remote desktop application (132), an aggregation of synchronous and asynchronous logic in a video adapter, a module of computer program instructions stored in memory of the video adapter and executed in a hardware thread by a dedicated graphics processor of a video adapter, and so on. Moreover, the remote desktop application (132) of the remote computer (152) is depicted in the example of FIG. 1 as standalone software application stored in RAM (168). Readers of skill in the art will immediately recognize that such a remote desktop application may also be implemented, in whole or part, as a component of the operating system (154), which is also stored in RAM (168) of the remote computer (152).

Operating systems useful for processing computer graphics generated by a remote computer for streaming to a client computer according to embodiments of the present invention include UNIX™, Linux™, Microsoft XP™, Microsoft Vista™, AIX™, IBM's i5/OS™, and others as will occur to those of skill in the art. The operating system (154), graphics module (114), compression profile (120), stream buffer (124) and remote desktop application (132) in the example of FIG. 1 are shown in RAM (168), but many components of such software typically are stored in non-volatile memory also, such as, for example, on a disk drive (170) or in flash memory (134).

The remote computer (152) of FIG. 1 also includes disk drive adapter (172) coupled through expansion bus (160) and bus adapter (158) to processor (156) and other components of the remote computer (152). Disk drive adapter (172) connects non-volatile data storage to the remote computer (152) in the form of disk drive (170). Disk drive adapters useful in computers that processing computer graphics generated by a remote computer for streaming to a client computer according to embodiments of the present invention include Integrated Drive Electronics ('IDE') adapters, Small Computer System Interface ('SCSI') adapters, and others as will occur to those of skill in the art. Non-volatile computer memory also may be implemented as an optical disk drive, electrically erasable programmable read-only memory (so-called 'EEPROM' or 'Flash' memory) (134), RAM drives, and so on, as will occur to those of skill in the art.

The example remote computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example remote computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary remote computer (152) of FIG. 1 includes a communications adapter (167) for data communications with a data communications network (100) and other computers, such as the server (102), personal digital assistant ('PDA') (104), mobile phone (106), laptop (108), workstation (110), personal computer (112). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for processing computer graphics generated by a remote computer for streaming to a client computer according to embodiments of the present invention include modems for wired dial-up communications, Ethernet (IEEE 802.3) adapters for wired data communications network communications, and 802.11 adapters for wireless data communications network communications.

The arrangement of servers, computers, networks, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
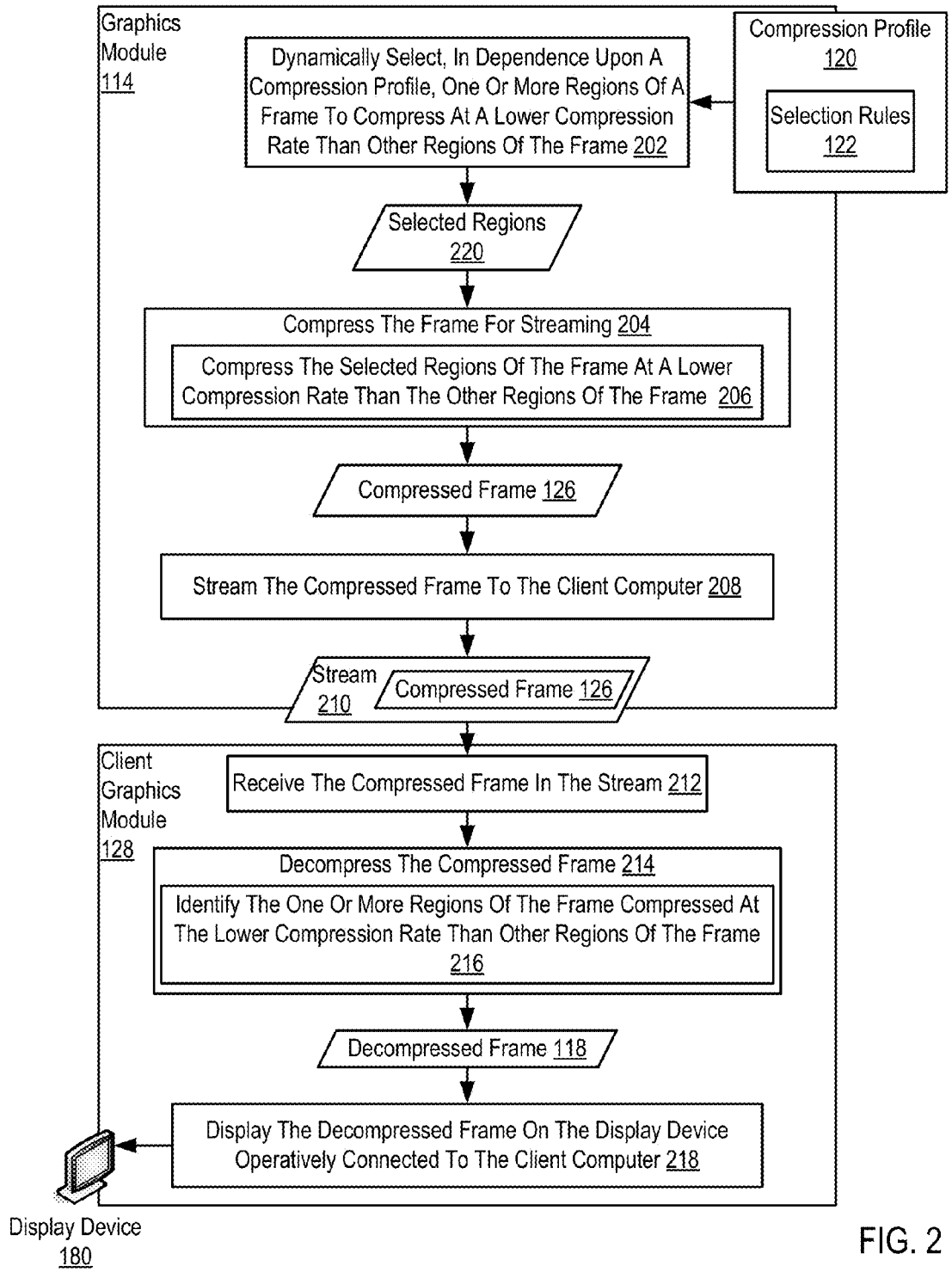
FIG. 2 sets forth a flow chart illustrating an exemplary method for processing computer graphics generated by a remote computer for streaming to a client computer according to embodiments of the present invention.

For further explanation, FIG. 2 sets forth a flow chart illustrating an exemplary method for processing computer graphics generated by a remote computer for streaming to a client computer according to embodiments of the present invention. In the method of FIG. 2, the computer graphics are generated by a remote computer for streaming to a client computer for display on a display device (180) operatively coupled to the client computer, the graphics are streamed to the client computer in a plurality of frames, and the client computer is connected for data communications to the remote computer through a data communications network.

For each frame (118) that is streamed to the client computer, the method of FIG. 2 includes dynamically selecting (202), by a graphics module (114) of the remote computer in dependence upon a compression profile (120), one or more regions (220) of the frame to compress at a lower compression rate than other regions of the frame. The compression profile includes one or more selection rules. A compression profile (120) is a data structure that includes selection rules (122) where such selection rules (122) indicate regions of a frame to compress at a lower compression rate than other regions of the frame. Examples of selection rules (122) may include an indication that an active graphical user interface ('GUI') window be designated as a region of a frame to compress at a lower compression rate than other regions of the frame, that a predefined portion, such as the upper-left quarter of the frame, be designated as a region of a frame to compress at a lower compression rate than other regions of the frame, that portions of the frame in which the change in graphics from the one or more previous frames is greater than a predetermined threshold be designated as a region of a frame to compress at a lower compression rate than other regions of the frame, and so on. An active GUI window is the currently focused window in the current window manager or explorer, that is, in the graphical user interface provided by the operating system.

A compression profile (120) may be established by a user through a GUI provided by the graphics module for such purpose. Such a compression profile may also be modified dynamically during the streaming of graphics to the client computer. That is, a user at a client computer may choose regions of frames to compress at a lower compression rate while receiving by the client computer a stream of the frames.

A region of the frame is an aggregation of pixels at particular locations within the frame. Examples of regions include an aggregation of pixels making up the upper-left quarter of a frame, an aggregation of pixels representing an active GUI window, an aggregation of pixels having values that have changed with respect to one or more previous frames, and so on as will occur to those of skill in the art.

Selecting (202) regions of a frame is carried out 'dynamically' in the example of FIG. 2 in that the selected regions, the aggregation of pixels, may be different for each frame. Consider as an example that an active GUI window located in the upper left corner of first frame is a selected region. If a user moves the location of the active GUI window from the upper left corner in the first frame to the lower right corner of a second frame, the selected region, the aggregation of pixels representing the active GUI window, of the second frame is different than the selected region of the first frame.

Dynamically selecting (202), by a graphics module (114) of the remote computer in dependence upon a compression profile (120), one or more regions (220) of the frame to compress at a lower compression rate than other regions of the frame may be carried out by identifying the one or more regions, assigning a predefined higher compression rate to the one or more regions, and assigning a predefined lower compression rate to the remaining regions. Alternatively, dynamically selecting (202) one or more regions (220) of the frame to compress at a lower compression rate than other regions of the frame may also be carried out by identifying the one or more regions, assigning, to the one or more regions, a particular codec for use in compression, and assigning to the remaining regions another different codec for use in compression.

A compression rate may generally refer to a number of bits per data sample to be stored or transmitted when compressed. Compressing regions of a frame at a higher compression rate typically introduces distortion or compression artifacts, flaws in the frame noticeable to the human eye, and therefore lowers the quality of visual perception by a human of the regions when decompressed and displayed on a computer display. Higher compression rates also generally decrease the amount of information necessary to represent the regions and therefore decreases the bandwidth required to transmit such compressed regions from the remote computer to the client computer across a data communications network. Compressing regions of a frame at a lower compression rate generally introduces few, if any, compression artifacts, however, and increases the quality of visual perception by humans of the regions when decompressed and displayed on the computer display. Although a lower compression rate generally decreases the amount of information necessary to represent the regions, the amount of information is generally greater than that necessary when a higher compression rate is used to compress a frame.

The method of FIG. 2 also includes compressing (204), by the graphics module (114), the frame for streaming including compressing (206) the selected regions (220) of the frame at a lower compression rate than the other regions of the frame. Compressing (204), by the graphics module (114), the frame for streaming including compressing (206) the selected regions (220) of the frame at a lower compression rate than the other regions of the frame may be carried out by first compressing the selected regions at a predefined higher compression rate through use of a codec, then compressing the remaining regions at a predefined lower compression through use of the same or a different codec. Alternatively, compressing (204), by the graphics module (114), the frame for streaming including compressing (206) the selected regions (220) of the frame at a lower compression rate than the other regions of the frame may be carried out by first compressing the selected regions at a predefined higher compression rate through use of a particular codec, such as lossless codec, then compressing the remaining regions through use of the same or a different codec, such as a lossy codec.

The word, 'codec,' may be a combination of any of the following: 'compressor-decompressor,' 'coder-decoder,' or 'compression/decompression.' A codec is a module of computer program instructions capable of performing compression and decompression of digital media content, that is, upon digital data in the form of a digital signal, digital file, or a stream of digital data, such as a stream of compressed frames. A lossy compression method is one where compressing data and then decompressing it retrieves data that may well be different from the original, but is close enough to be useful in some way. A lossless compression method is which allows the exact original data to be reconstructed from the compressed data. Codecs encode or compress a file or a stream for transmission, storage, or encryption and decode or decompress the file for playback, viewing or editing. Codecs are often used in videoconferencing and streaming media applications. A video camera's analog-to-digital ('ADC') converts its analog signals into digital signals, which are then passed through a codec for digital transmission or storage.

Many multimedia data streams contain both audio and video data, and often some form of metadata that permits synchronization of the audio and video. Each of these three streams may be handled by different programs, processes, or hardware; but for a multimedia data stream or file to be useful in stored or transmitted form, the audio and video data are encapsulated together in a container format, a digital media content file or stream format. Audio Video Interleave ('AVI'), sometimes referred to as a codec, is in fact a container format, which many codecs might use. There are other well known alternative containers such as Ogg, ASF, QuickTime, RealMedia, Matroska, and MP4. Examples of codecs useful for processing computer graphics generated by a remote computer for streaming to a client computer according to embodiments of the present invention include:

H.261
H.263
MPEG-4 ASP (Advanced Simple Profile) or MPEG-4 Part 2
H.263v2
H.264, also known as MPEG-4 AVC (Advanced Video Coding) or MPEG-4 Part 10
KVCD
MJPEG
MPEG-1 Video
MPEG-2 Video
MPEG-4 ASP (Advanced Simple Profile)
MPEG-4 AVC (Advanced Video Coding)
Pixlet
RealVideo
Snow Wavelet Codec
Tarkin
Theora
VC-1
Windows Media Video
And others—as may occur to those of skill in the art Dynamically selecting (202) one or more regions (220) of the frame to compress at a lower compression rate than other regions of the frame and compressing (204) such selected regions may vary in dependence upon the selection rules (122) of the compression profile (120). As mentioned above, the selection rules (122) may indicate that an active GUI window be designated as a region of a frame to compress at a lower compression rate than other regions of the frame, that a predefined portion, such as the upper-left quarter of the frame, be designated as a region of a frame to compress at a lower compression rate than other regions of the frame, that portions of the frame in which the change in graphics from the one or more previous frames is greater than a predetermined threshold be designated as a region of a frame to compress at a lower compression rate than other regions of the frame, and so on.

If the selection rules (122) indicate that an active GUI window be designated as a region of a frame to compress at a lower compression rate than other regions of the frame, dynamically selecting (202) one or more regions (220) of the frame to compress at a lower compression rate than other regions of the frame may include selecting an active GUI window as a region of the frame to compress at the lower compression rate than other regions of the frame and compressing (204), by the graphics module (114), the frame for streaming may include compressing the active GUI window at the lower compression rate than the other regions of the frame. In this case, the active window, the window currently in use by the user, is the compressed at the highest quality in comparison to all other regions of the frame.

Selecting an active GUI window as a region of the frame to compress at the lower compression rate than other regions of the frame may be carried out by calling a function of an API exposed by an operating system of the remote computer that returns the identification of the active window and its location within the frame, typically expressed as a combination of a single location of one corner of the active window and the dimensions of window.

If the selection rules (122) indicate that a predefined portion be designated as a region of a frame to compress at a lower compression rate than other regions of the frame, dynamically selecting (202) one or more regions (220) of the frame to compress at a lower compression rate than other regions of the frame may include selecting one or more predefined portions of fixed sizes and locations of the frame as regions of the frame to compress at the lower compression rate than other regions of the frame, and compressing (204), by the graphics module (114), the frame for streaming may include compressing the one or more predefined portions at the lower compression rate than the other regions of the frame. In such a case the selection rules may identify the fixed size and location of each predefined portion. Compressing predefined portions at a lower compression rate yields areas of a frame that are higher visual quality to a user. A user then may drag GUI windows into that area while using the remote computer such that the GUI windows, when dragged into that area, are of a higher visual quality to the user when decompressed and displayed at the remote computer.

If the selection rules (122) indicate that portions of the frame in which the change in graphics from the one or more previous frames is greater than a predetermined threshold be designated as a region of a frame to compress at a lower compression rate than other regions of the frame, dynamically selecting (202) one or more regions (220) of the frame to compress at a lower compression rate than other regions of the frame may include selecting portions of the frame in which a change in graphics from one or more previous frames is greater than a predetermined threshold as regions of the frame to compress at the lower compression rate than other regions of the frame and compressing (204) the frame for streaming may include compressing the portions of the frame in which the change in graphics from the one or more previous frames is greater than the predetermined threshold at the lower compression rate than the other regions of the frame.

Selecting portions of the frame in which a change in graphics from one or more previous frames is greater than a predetermined threshold as regions of the frame to compress at the lower compression rate than other regions of the frame may be carried out by tracking in a history of graphics changes the number of changes of each pixel or group of pixels over a predefined number of frames and selecting the pixel or group of pixels having number of changes over the predefined number of frames greater than a predetermined threshold. Consider for example a set of pixels having 20 changes over 30 frames and another set of pixels having only 1 change over 30 frames. Consider also that the predetermined threshold is 15 changes over 30 frames. The graphics module in this example may select, as a region of the frame to compress at a lower compression rate, the set of pixels of the frame having 20 changes over the past 30 frames. Compressing regions in which a change in graphics from one or more previous frames is greater than a predetermined threshold at a lower compression rate may be useful to increase visual quality of a video or other rapidly changing graphics streamed to the client computer.

The method of FIG. 2 also includes streaming (208) the compressed frame (126) to the client computer. Streaming (208) the compressed frame (126) to the client computer may be carried out by a remote desktop application or by the graphics module if the graphics module is implemented as a software component of the remote desktop application. Either the remote desktop application or the graphics module may stream the compressed frame by storing the compressed frame (126) in a stream buffer for orderly transmission of the contents of the stream buffer to the client computer.

The method of FIG. 2 also includes receiving (212), by a client graphics module (128) of the client computer, the compressed frame (126) in the stream (210), decompressing (214), by the client graphics module (128), the compressed frame (126) including identifying (216) the one or more regions (220) of the frame compressed at the lower compression rate than other regions of the frame, and displaying (218) the decompressed frame on the display device (180) operatively coupled to the client computer.

Decompressing (214), by the client graphics module (128), the compressed frame (126) may include identifying (216) the one or more regions (220) of the frame compressed at the lower compression rate than other regions of the frame, decompressing the one identified regions at the lower compression rate and decompressing the remaining regions at the higher compression rate. Identifying (216) the one or more regions (220) of the frame compressed at the lower compression rate than other regions of the frame may include identifying the one or more regions in dependence upon a client compression profile or in dependence upon metadata received in the stream describing the frame. A client compression profile is data structure similar to the compression profile of the remote computer in that the client compression profile includes rules, similar to the selection rules, that identify the regions. In fact, in some embodiments the client compression profile and compression profile of the remote computer are identical. As an alternative to configuring the client computer and client graphics module with a client compression profile, metadata may be sent in the stream (210) along with the frames to identify the regions, either by type, such as identifying the active window, or by location and size in the frame.

Decompressing (214), by the client graphics module (128), the compressed frame (126) may also include decompressing, by the client graphics module, the compressed frame through use of a codec, typically the same codec used to compress the region. Either the client compression profile or metadata transmitted along with the stream may identify the particular codec to use or the particular compression rate used in compressing the regions of the frame. Such a profile or metadata may, for example, indicate that one set of regions was compressed using a lossy codec while another set was compressed using a lossless codec. As such, the client graphics module may load and execute the codec identified to decompress the regions.

For further explanation, FIG. 3 sets forth a line drawing of an exemplary processed frame (300) of computer graphics generated by a remote computer for streaming to a client computer according to embodiments of the present invention. The frame (300) in the example of FIG. 3 includes an active GUI window (304), an inactive GUI window (302), several icons (306), icon text (308), a taskbar (310), and so on.

In this example, the selection rules of the compression profile of the remote computer indicate that the active GUI window (304) be a region of a frame (300) to compress at a lower compression rate than other regions of the frame. The graphics module of the remote computer, in dependence upon such selection rules of the compression profile, has selected the active window (304) as a region (220) of the frame (300) to compress at a lower compression rate than other regions of the frame, has compressed the frame, and streamed the frame to the client computer where it has been decompressed and displayed. The selected region (220) in the example of FIG. 3 is displayed at a higher quality, due to the lower compression rate, than the remaining regions of the frame, such as the inactive window (302), icons (306), icon text (308), taskbar (310), the background, and so on.

For further explanation, FIG. 4 sets forth a line drawing of a further exemplary processed frame (400) of computer graphics generated by a remote computer for streaming to a client computer according to embodiments of the present invention. The frame (400) in the example of FIG. 3 includes an active GUI window (304), an inactive GUI window (302), several icons (306), icon text (308), a taskbar (310), and so on.

In this example, the selection rules of the compression profile of the remote computer indicate that a predefined portion, the middle-third of each frame, be a region of the frame to compress at a lower compression rate than other regions of the frame. The graphics module of the remote computer, in dependence upon such selection rules of the compression profile, has selected the predefined portion of the frame (400) as a region (220) of the frame (300) to compress at a lower compression rate than other regions of the frame, has compressed the frame, and streamed the frame to the client computer where it has been decompressed and displayed. The selected region (220) in the example of FIG. 3, the middle-third of the frame, is displayed at a higher quality, due to the lower compression rate, than the remaining regions of the frame, such as the inactive window (302), icons (306), icon text (308), taskbar (310), the background, and so on. An upper-portion of the active window (304) and a lower portion of the inactive window (302) in this example are located within the selected region and as such will be displayed at a higher visual quality. Also in this example, a user may drag various GUI components, GUI windows (302, 304), icons, and the like, into the selected region to increase the visual quality of such components when displayed on a computer display of the remote computer.

Exemplary embodiments of the present invention are described largely in the context of a fully functional computer system for processing computer graphics generated by a remote computer for streaming to a client computer. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of processing computer graphics generated by a remote computer for streaming to a client computer for display on a display device operatively coupled to the client computer, the graphics streamed to the client computer in a plurality of frames, the client computer connected for data communications to the remote computer through a data communications network, the method comprising:

for each frame:
receiving, by a client graphics module of the client computer, a compressed frame in a stream of frames;
decompressing, by the client graphics module, the compressed frame including identifying one or more regions of the frame compressed at a lower compression rate than other regions of the frame in dependence upon metadata received in the stream describing the frame, wherein the metadata identifies the type of each region in the frame and the compression rate for each region; and
displaying the decompressed frame on the display device operatively coupled to the client computer.

2. The method of claim 1 wherein identifying the one or more regions of the frame compressed at the lower compression rate than other regions of the frame further comprises:
identifying the one or more regions of the frame compressed at the lower compression rate than other regions of the frame in dependence upon a client compression profile.

3. The method of claim 1 wherein:
wherein the one or more regions of the frame compressed at the lower compression rate than other regions of the frame is an active GUI.

4. The method of claim 1 wherein:
wherein the one or more regions of the frame compressed at the lower compression rate than other regions of the frame includes one or more predefined portions.

5. The method of claim 1 wherein:
wherein the one or more regions of the frame compressed at the lower compression rate than other regions of the frame includes the portions of the frame in which the change in graphics from the one or more previous frames is greater than a predetermined threshold.

6. An apparatus for processing computer graphics generated by a remote computer for streaming to a client computer for display on a display device operatively coupled to the client computer, the graphics streamed to the client computer in a plurality of frames, the client computer connected for data communications to the remote computer through a data communications network, the apparatus comprising a computer processor, a computer memory operatively coupled to the computer processor, the computer memory having disposed within it computer program instructions capable of:

for each frame:
receiving, by a client graphics module of the client computer, a compressed frame in a stream of frames;
decompressing, by the client graphics module, the compressed frame including identifying one or more regions of the frame compressed at a lower compression rate than other regions of the frame in dependence upon metadata received in the stream describing the frame, wherein the metadata identifies the type of each region in the frame and the compression rate for each region; and
displaying the decompressed frame on the display device operatively coupled to the client computer.

7. The apparatus of claim 6 wherein identifying the one or more regions of the frame compressed at the lower compression rate than other regions of the frame further comprises:
 identifying the one or more regions of the frame compressed at the lower compression rate than other regions of the frame in dependence upon a client compression profile.

8. The apparatus of claim 6 wherein:
 wherein the one or more regions of the frame compressed at the lower compression rate than other regions of the frame is an active GUI window.

9. The apparatus of claim 6 wherein:
 wherein the one or more regions of the frame compressed at the lower compression rate than other regions of the frame includes one or more predefined portions.

10. The apparatus of claim 6 wherein:
 wherein the one or more regions of the frame compressed at the lower compression rate than other regions of the frame includes the portions of the frame in which the change in graphics from the one or more previous frames is greater than a predetermined threshold.

11. A computer program product for processing computer graphics generated by a remote computer for streaming to a client computer for display on a display device operatively coupled to the client computer, the graphics streamed to the client computer in a plurality of frames, the client computer connected for data communications to the remote computer through a data communications network, the computer program product disposed in a computer readable medium, wherein the computer readable medium is not a signal transmission medium, the computer program product comprising computer program instructions capable of:
 for each frame:
  receiving, by a client graphics module of the client computer, a compressed frame in a stream of frames;
  decompressing, by the client graphics module, the compressed frame including identifying one or more regions of the frame compressed at a lower compression rate than other regions of the frame in dependence upon metadata received in the stream describing the frame, wherein the metadata identifies the type of each region in the frame and the compression rate for each region; and
  displaying the decompressed frame on the display device operatively coupled to the client computer.

12. The computer program product of claim 11 wherein identifying the one or more regions of the frame compressed at the lower compression rate than other regions of the frame further comprises:
 identifying the one or more regions of the frame compressed at the lower compression rate than other regions of the frame in dependence upon a client compression profile.

13. The computer program product of claim 11 wherein:
 wherein the one or more regions of the frame compressed at the lower compression rate than other regions of the frame is an active GUI window.

14. The computer program product of claim 11 wherein:
 wherein the one or more regions of the frame compressed at the lower compression rate than other regions of the frame includes one or more predefined portions.

15. The computer program product of claim 11 wherein:
 wherein the one or more regions of the frame compressed at the lower compression rate than other regions of the frame includes the portions of the frame in which the change in graphics from the one or more previous frames is greater than a predetermined threshold.

16. The computer program product of claim 11 wherein the signal bearing medium comprises a recordable medium.

* * * * *